United States Patent [19]
Carr

[11] 3,954,160
[45] May 4, 1976

[54] MECHANICALLY ACTUATED DISC BRAKE ASSEMBLY

[76] Inventor: Scott Carr, 4891 Troth St., Mira Loma, Calif. 91752

[22] Filed: May 8, 1975

[21] Appl. No.: 575,654

[52] U.S. Cl. .......................... 188/106 F; 188/72.7; 188/72.9; 403/297
[51] Int. Cl.² ......................................... F16D 65/18
[58] Field of Search ......... 188/106 R, 106 F, 106 P, 188/71.8, 72.1, 72.6, 72.7, 72.9, 217; 192/93 R, 93 C; 403/290, 297

[56] References Cited
UNITED STATES PATENTS

| | | | |
|---|---|---|---|
| 2,319,231 | 5/1943 | Hawley | 188/72.6 |
| 2,972,495 | 2/1961 | Yalen | 403/297 |
| 3,335,819 | 8/1967 | Swift | 188/72.6 |
| 3,337,008 | 8/1967 | Traclite | 188/106 F |
| 3,371,750 | 3/1968 | Schutte et al. | 188/71.8 |
| 3,404,756 | 10/1968 | Swift | 188/72.6 |
| 3,459,282 | 8/1969 | Hoenick et al. | 188/106 F |
| 3,741,350 | 6/1973 | Knapp | 188/106 F |
| 3,788,430 | 1/1974 | Hunt | 188/106 F |

Primary Examiner—Trygve M. Blix
Assistant Examiner—Edward R. Kazenske
Attorney, Agent, or Firm—Ben E. Lofstedt

[57] ABSTRACT

The present disclosure relates to a disc brake assembly and more particularly to a combined hydraulic and mechanical brake assembly which includes a manually actuated brake for applying the disc brake pads to the disc for both parking and emergency purposes and means to automatically adjust the brake in response to brake pad wear, including a lever-actuated, reciprocating plunger having a tapered nose disposed within an tubular expander having a series of annular teeth thereabout, wherein the expander is freely disposed within a hydraulically operable piston slidably disposed within a cylinder. When the plunger nose is directed into engagement with the fingers, the fingers are radially expanded into meshing engagement with a second series of teeth disposed about the inside of the piston. Once engaged, further axial movement of the plunger carries the piston-operated brake pads into frictional engagement with the brake disc. When the lever is retracted, the process is reversed and the brake pads are frictionally disengaged.

9 Claims, 3 Drawing Figures

MECHANICALLY ACTUATED DISC BRAKE ASSEMBLY

BACKGROUND OF THE INVENTION

1. Field of the Invention

The present invention lies in the field of caliper type disc brakes wherein the brake may be alternatively under hydraulic or manual control.

2. Description of the Prior Art

One of the major difficulties in the utilization of caliper type disc brakes for the rear wheel(s) of a two or four wheeled vehicle is the problem of combining a mechanical, manually-operated brake control assembly to effect the requisite parking or emergency braking function.

Various prior art attempts to create such a combination have not been generally accepted because of the lack of an effective, simple and low-cost unit which can be readily adapted to existing disc brake designs. Examples of the prior art include U.S. Pat. Nos.: 3,185,263; 3,335,819; 3,337,008; 3,378,109 and 3,788,430.

U.S. Pat. No. 3,185,263 relates to a disc brake construction which employs a single control system which is operable under alternatively hydraulic or manual control. Basically, it incorporates the use of a pair of oppositely-disposed, hydraulically-separable pistons. The use of hydraulically separable pistons, under manual actuation of the brake elements, will tend to increase the gap between the pistons with the possibility of objectionable air aspiration into the hydraulic fluid in the cylinder. In an attempt to over this problem, a second embodiment is disclosed which makes use of a spring 238 positioned between the extremity 213 of the lever 211 used to manually actuate the brake. The spring 238 is used for maintaining piston 205 substantially stationary, irrespective of any motion of lever 211. However, following a certain number of spring flexures, it will fatigue and break. When this occurs, the air aspiration problem again presents itself. Additionally, it should be noted that this particular structural arrangement employs a substantial number of hydraulic fluid seals which are necessary to prevent leakage of the hydraulic fluid from its closed operational cavity. Still further, this particular arrangement does not include an automatic or self-adjusting mechanism to compensate for brake pad wear. Consequently, such adjustment must be made independently of the particular assembly disclosed therein.

Both U.S. Pat. Nos. 3,335,819 and 3,337,008 relate to disc brake assemblies which may be hydraulically or mechanically actuated. Fundamentally, these particular devices employ a modified hydraulic piston which interlocks with a manually operated lever to provide the desired parking or emergency brake function. The modified hydraulic piston possesses a bored-out portion with a series of sawtooth-like annular ridges therein. A radially expandable mating plug having a plurality of external gear teeth thereabout is adapted to fit loosely within the bored-out portion in its unexpanded condition and is immersed in the hydraulic fluid to protect it against fouling. The expandable plug is secured to a lever which, when actuated, causes the plug to adjustingly interlock the external gear teeth with the sawtooth ridges of the piston, thereby creating a mechanical link therebetween. Further actuation of the lever will thereafter force the piston into contact with the disc brake shoe thereby actuating the disc brake. Both of these arrangements are not only relatively complex, but are costly as well. Further, immersing the adjustment mechanisms in the hydraulic fluid creates the highly undesirable problem of contamination of the fluid as the intermeshing teeth wear against one another, especially during the actual adjustment phase.

U.S. Pat. No. 3,378,109 relates to a mechanical or manual brake assembly for use in conjunction with a caliper type disc brake. It operates separately and distinct from the hydraulically actuated disc brake.

U.S. Pat. No. 3,788,430 uses a radially-expandable plug similar to U.S. Pat. Nos. 3,335,819 and 3,337,008; however, its operation is quite different from the mechanisms shown in these patents. This arrangement is both complex and costly. Further, the brake wear adjustment mechanism is immersed in the hydraulic braking fluid which is highly undesirable as previously discussed.

SUMMARY OF THE INVENTION AND OBJECTS

The present invention relates to a disc brake actuator and more particularly to an integrated disc brake construction having a piston-actuated disc brake wherein the piston may be operated by either a hydraulic or a mechanical control system. Typically, the hydraulic brake control system is used for normal, service type brake operation and the mechanical control is used primarily as an emergency or parking brake. The mechanism for mechanically actuating the brake is adapted to a disc brake wheel cylinder arrangement so that it acts on the wheel cylinder piston to move the piston in the same direction as it is moved during hydraulic actuation. The device includes a lever which acts to move a tapered plunger axially into the body of an expander formed from a tubular body and having a plurality of fingers with a series of annularly arranged teeth disposed on the external faces of the fingers. When the end of the tapered plunger contacts the movable ends of the fingers, the fingers are forced radially apart and, thereafterwards, the teeth of the fingers are mated with corresponding teeth disposed about the inside of a bored out portion of the brake piston. Once mated, further axial movement by the plunger carries the piston into contact with the brake shoe causing the brake shoe to engage the brake disc.

When the lever is retracted, the spring force of the expander fingers forces the plunger outwardly from the body of the expander. The fingers retract and allow the teeth of the fingers and the piston bore to unmate, thereby removing the brake shoe engaging force and disengaging the brake shoe from the brake disc.

The novel features which are considered as characteristic for the invention are set forth in particular in the appended claims. The invention itself, however, both as to its construction and its method of operation, together with additional objects and advantages thereof, will be best understood from the following description of specific objects and embodiments when read in connection with the accompanying drawings.

It is an object of the present invention to provide a mechanical brake actuating means which is operatively associated with the hydraulically operated portion of the brake, whereby the same brake actuating piston may be employed for actuating the brakes both hydraulically and mechanically.

A further object of the instant invention is to provide in combination with the manual brake actuating piston means for adjusting one part thereof to compensate for wear on the brake shoe linings. Therefore, when the mechanical (manual) means is used to apply the brakes, the brake linkage automatically adjusts itself to compensate for wear on the brake shoe linings.

An important object of the present invention is to provide a disc brake construction wherein a hand operated brake mechanism is provided as an integral part thereof with the smallest additional space usage by employing the same brake linings for both the mechanical and hydraulic systems.

Another important object of the present invention is to provide a disc brake construction which incorporates mechanical brake actuation means in addition to the normal hydraulic system to mechanically operate the brake wherein the aforementioned additional mechanical means is included in such a manner as to substantially maintain the overall axial length of the brake construction at a minimum.

It is a still further object of the instant invention to provide a disc brake construction including means for effecting automatic adjustment of the spacing between the brake linings and the brake disc with reference to the mechanical means in such a way that adjustment of the brakes does not necessitate adjustment of the actuating linkage for the mechanical brake actuation means.

Another primary object of the present invention is to provide a disc brake construction including means for effecting automatic adjustment of the spacing between the brake linings and the brake disc wherein said adjusting means may be required to be included within the hydraulic system of the brake construction to prevent fouling thereof.

Yet another important and primary object of the present invention is to provide a disc brake construction including means for effecting mechanical actuation thereof and means for effecting automatic adjustment of the spacing between the brake linings and the brake disc with reference to the mechanical means in such a fashion that said aforementioned adjustment does not require adjustment of the mechanical actuating linkage for the mechanical means.

It is yet still another important object of the instant invention to provide a disc brake construction including locking means for effecting automatic adjustment of the spacing between the brake linings and the brake disc and which may be disengaged in a relatively simple manner to effect replacement of the brake linings.

The subject matter which I regard as my invention is particularly pointed out and distinctly claimed in the concluding portion of this Specification. The invention itself, however, both as to its organization and method of operation, together with further objects and advantages thereof, may be better understood by reference to the following description taken in connection with the accompanying drawings:

DETAILED DESCRIPTION OF A PREFERRED EMBODIMENT OF THE INVENTION

Figure 1:
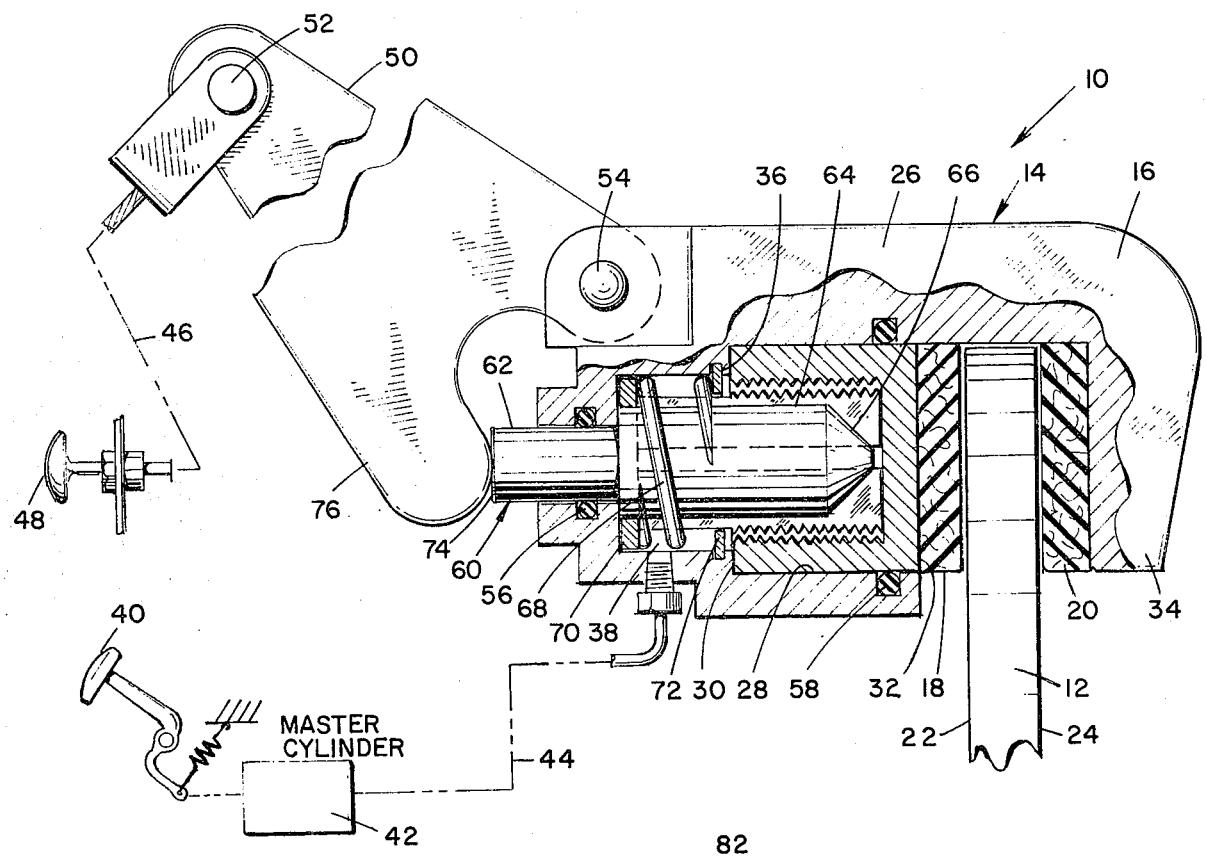
FIG. 1 is a side elevational view, partly in section, of a hydraulically and manually operable brake system according to the invention, depicted in a non-braking position.

With general reference now to the drawings, and more particularly at this time to FIG. 1, a disc brake assembly is generally indicated at 10 and includes a disc 12 normally attached to a rotatable member such as a vehicle wheel. The caliper assembly 14 includes a caliper frame 16 which is generally U-shaped and extends over the pheriphery of the disc 12 so as to support the brake shoe pucks 18, 20 on opposite sides of the disc 12 for engagement with the faces 22, 24 of the disc 12 which form the disc friction braking surfaces. The caliper arm 26 includes a portion formed to provide a cylinder 28 in which is mounted, for reciprocal movement, the piston 30.

Brake shoe puck 18 is typically secured to the end face 32 of the piston 30 by adhesively bonding it thereto. In similar fashion, but disposed on the other side of the disc 12, brake shoe puck 20 is adhesively secured to leg 34 of the caliper frame 16. However, it should be noted that although pucks 18, 20 are typically secured to the piston by adhesive means, the pucks 18, 20 may be readily secured in their respective positions by other securing means, such as, for example, threaded fasteners, i.e. bolts, and the like.

The brake shoe puck 18 is so positioned on the end face 32 of the piston 30 so that when the piston 30 is moved toward the disc 12, the puck 18 will be brought into frictional engagement with the disc face 24.

Simultaneously, the caliper frame 16 is moved in the opposite direction relative to the piston 30 because of hydraulic reaction on the area of the cylinder base 36, thus moving caliper leg 34 and the brake shoe puck 20 so that the puck 20 engaged the other frictional braking surface of disc 12; namely: disc face 24. Hydraulic brake operating pressure is suitably provided in the pressure chamber 38, formed by cylinder 28, piston 30 and cylinder base 36. Such hydraulic brake operating pressure is typically delivered into the pressure chamber 38 by means of a vehicular foot-operated braking pedal 40 which is mechanically lined to the operating plunger of the vehicle's master cylinder 42 which is hydraulically-coupled to the pressure chamber 38 via the hydraulic tubing 44. When the pedal 40 is depressed, the mechanical linkage between the pedal 40 and the plunger of the master cylinder 42 is forced into the master cylinder 42 thereby developing hydraulic pressure. The hydraulic pressure is thereafterwards delivered to the pressure chamber 38 via the hydraulic tubing 44 thereby effectuating the braking action previously described. When the brake pedal 40 is released, the braking action ceases because hydraulic pressure is no longer being developed by the master cylinder 42. Consequently, normal vehicular braking which occurs during operation of the vehicle, will be effectuated on a demand basis, rather than on a "continuous" basis. Hydraulic, O-ring-type seals 56 and 58 are disposed within the cylinder 28 to provide both static and dynamic hydraulic sealing for the pressure chamber 38.

Figure 2:
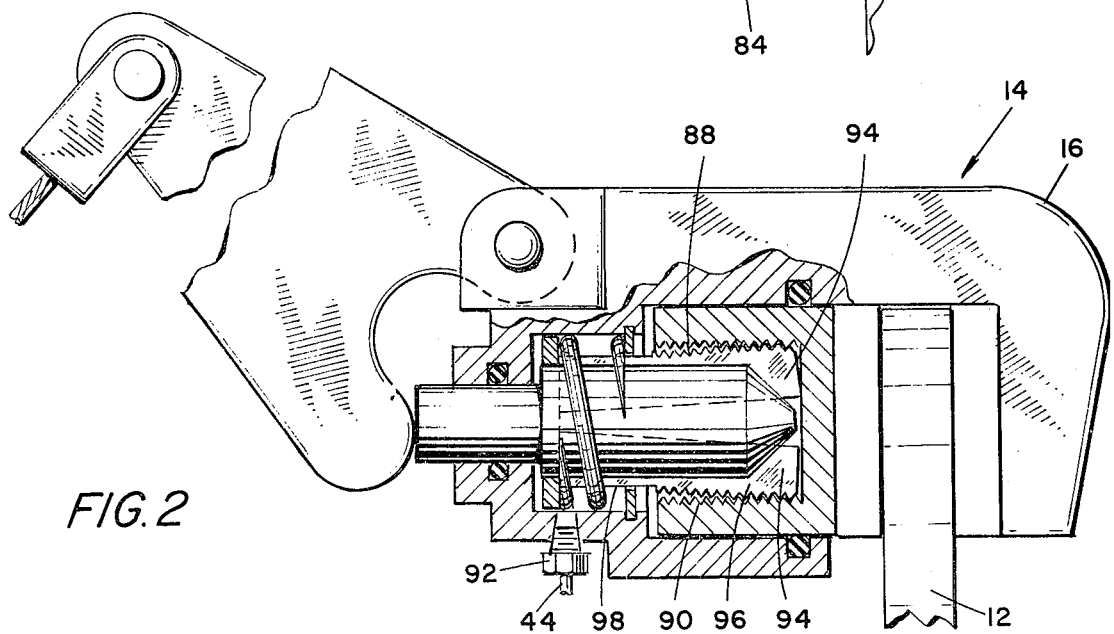
FIG. 2 is a side elevational view, partly in section, of a hydraulically and manually operable brake system according to the invention, depicted in a braking position.

As is clearly shown in FIG. 1, the plunger, generally indicated at 60, is slideably disposed within the cylinder 28 and is principally divided into two structurally and functionally different sections. One section of the plunger 60 forms a cap 62 and is typically smaller in diameter than the other section and projects behond the cylinder 28 housing the hydraulic pressure chamber 38 so as to engage the finger 76 of the lever 50. The other section of the plunger 60 forms a shank 64 which is disposed entirely within the hydraulic pressure chamber 38 and further possesses a tapered nose 66, the function of which will become apparent as the description of the invention proceeds. Slideably disposed immediately about the shank 64 of the plunger 60 is an expander 96. The expander 96, as shown in FIGS. 1 and 2, has a generally tubular body having a series of external teeth 88 about the end of the expander 96 disposed within the hollow piston 30 and a flange 70 about the opposite end of the expander 96.

It should be noted at this time that a corresponding series of teeth 90 adapted to be mateable with the external teeth 88 about the expander 96 are disposed about the inside of the hollow piston 30, whose functional contribution to the present invention will become readily apparent as the description of the invention proceeds hereinafterwards.

The expander 96 is slotted to form a plurality of fingers 94, the inside of the end of the fingers 96 facing the bottom of the hollow piston 30 forming a tapered mating receptacle for the nose 66 of the plunger 60. A compression spring 68 is provided about the expander 96 wherein one of the ends of the spring 68 is abutted against the flange 70 of the expander 96 and the other end of the spring 68 is abutted against a retainer ring 72 set in a groove in the cylinder 28.

If the brake system is to be actuated manually on a continuous basis for the purpose of functioning as a parking or emergency brake, handle 48 is pulled thereby causing cable 46, secured to lever 50 via pin 52, to pivot lever 50 counterclockwise about pin 54 by which lever 50 is secured to the caliper frame 16. At the same time, the finger 76 of the lever 50, via its contact with face 74 of the cap 62 of the plunger 60, forces the shank 64 of the plunger 60 further into the cylinder 28. This action forces the nose 66 of the plunger 60 into intimate contact with the tapered mating receptacle for the nose 66 formed about the inside of the end of the fingers 94 of the expander 96, and due to the inclined surfaces of the tapered nose 66 and the nose 66 mating receptacle of the fingers 94 and the relative movement therebetween, the fingers 94 are forced radially outward until the teeth 88 are directed into intermeshing relationship with the piston teeth 90 and further compressing the spring 68. The spring 68 acts as a means for constraining relative movement between the plunger 60 and the expander 96 so that the plunger nose 66 will not merely urge the expander further into the piston 30 but will radially expand the fingers 94 as previously described. Continued counterclockwise movement of the lever 50 thereafterwards directs the piston 40 towards the disc 12, until the brake puck 18 disposed on the piston face 32 comes into frictional engagement with face 22 of disc 12. When this occurs, brake puck 20 is also brought into frictional engagement with disc face 24 due to the relative movement of caliper leg 34 as previously described herein.

To release the brake pucks 18, 20 from frictional engagement with the disc 12, the handle 48 is returned to its former position, thereby removing the lever pivoting force applied to the lever 50 via the cable 46. With force removed, the lever 50 is free to pivot about pin 54. The fingers 94 of the expander 96 due to their radially expanded condition, now possess stored spring energy. The effect of this stored spring energy is to urge the fingers 94 radially inward. Since the pivotal force is now removed from the lever 50, there no longer exists a force which will maintain the nose 66 of the plunger 60 against the fingers 94 to maintain the fingers 94 in their radially expanded positions. Consequently, the fingers 94 are moved radially inward to assume their former unexpanded positions, thereby disengaging the teeth 88 from the piston teeth 90 and the spring 68 directs expander 96 outwardly from the piston 30. The fingers 94 remain engaged with the plunger 60 thereby also causing the plunger 60 to move correspondingly therewith, thereby maintaining the engagement between the face 74 of the plunger cap 62 with the lever finger 76. Consequently, the cable 46 - lever 50 system does not require any adjustment during the life of the pucks 18, 20. Accordingly, the action of this arrangement is such as to incorporate an automatic, brake wear adjustment mechanism in the disc brake assembly 10 for maintaining the operability of the mechanical brake actuator device.

While only a preferred embodiment of the invention has been disclosed, it will be readily apparent that certain variations in the invention can be made without departing from the spirit of the invention, and, it is, therefore, to be understood that the invention is not to be limited solely thereto, but only by the scope of the appended claims.

For example, it should be readily understood by those skilled in the art, that the present invention is operable solely as a mechanical system and does not depend, in any substantial fashion, upon the hydraulic system normally used for brake actuation.

Figure 3:
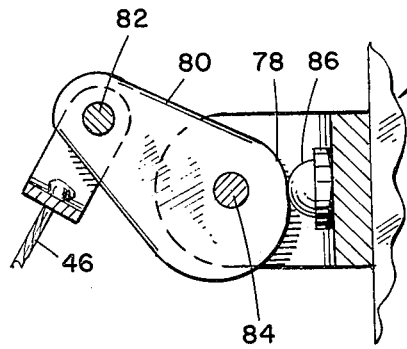
FIG. 3 is a view of another means for manually actuating the brake system.

Additionally, it should be noted, with reference now to FIG. 3, wherein there is shown and described yet another type of mechanical linkage for manually reciprocating the plunger 60 within the cylinder 28 of the disc brake assembly 10. In manually actuating the handle 48, the cable 46 linked to one end of the lever 80 via pin 82 and the bracket to which cable 46 is terminated, causes lever 80 to pivot about pin 84 which is secured to the caliper assembly 14. At the opposite end of the lever 80, a camming surface 78 is provided which is cammingly engaged with a spherically-shaped element 86, such as a rotating ball bearing within a socket, secured to the cap 62 of the plunger 60. The rationale for employing a camming surface 78 and spherical element 86 is that the mechanical advantage is not dictated soley by distance traveled as in the case of the lever 50 shown in FIGS. 1 and 2. The result is that a greater mechanical advantage can be achieved by the cam-actuated mechanism for the same degree of handle 48/cable 46 travel. This can be a very important and significant advantage when the invention is employed as an automotive or vehicular wheel brake, since in such applications there frequently exists severe space limitations regarding such handle/cable travel. These very same restrictions apply equally to piston travel as well.

Having now described my invention, what I claim as new and desire to secure by Letters Patent of the United States of America, is:

1. A disc brake actuator, comprising:
   a tubular housing;
   a piston having a passageway therein, said piston being slidably disposed within said housing and having a plurality of teeth disposed about said passageway of said piston;

mechanical actuating means including an axially-displaceable plunger having two ends, one end extending into said passageway of said piston and having a taper thereabout forming a tapered nose and said other end extending outside of said piston and forming a cap for engagement with a lever means for axially displacing said plunger;

tubular expander means including a continuous top portion and a longitudinally slotted shank portion forming a plurality of radially expandable fingers with a plurality of externally-arranged teeth thereabout for locking engagement with said piston teeth, said expander means slidably disposed about said plunger adjacent said tapered nose and further having interiorly thereof, adjacent the radially-expandable extremities of said fingers, tapered surfaces for cooperative engagement with said tapered nose of said plunger;

means for constraining the axial displacement of said expander means when said nose of said plunger engages said interior tapered surfaces of said fingers and radially expands said fingers;

said plunger being moved, in unidirectional fashion, further into said expander means so that said plunger nose engages said interior tapered surfaces of said fingers whereupon further plunger nose movement thereinto will cause said fingers to expand radially outward to direct said teeth of said expander means into locking engagement with said piston teeth thereby interlocking said expander means with said piston and simultaneously developing in said fingers a spring force urging said fingers radially inward, wherein afterwards as said plunger is moved still further it thereby imparts corresponding unidirectional motion to said piston to mechanically apply said disc brake, and when said plunger ceases to be urged in said aforementioned unidirectional fashion, as said spring force urgingly directs said fingers to radially contract, a reverse unidirectional movement is imparted to said plunger thereby unlocking said teeth and thereafterwards disengaging said disc brake.

2. The disc brake actuator of claim 1, wherein said constraining means comprises means for positioning said plunger in an initial position prior to axial displacement thereof and for returning said plunger to said initial position following removal of the axially displacing force by said mechanical actuating means.

3. The disc brake actuator of claim 1, wherein said constraining means comprises means for locating said plunger and expander means in an initial position prior to axial displacement thereof and for returning said plunger and expander means to said initial position following removal of the axially displacing force by said mechanical actuating means.

4. The disc brake actuator of claim 1, wherein said means for constraining the axial displacement of said expander means when said nose of said plunger engages said interior tapered surfaces of said fingers and radially expands said fingers includes an external flange about said top of said expander means and biasing means compressively disposed between said flange and said housing.

5. The disc brake actuator of claim 1, wherein said mechanical actuating means further includes:
a cable;
manual cable actuation means; and
said lever means including a finger adjacent one end thereof projecting therefrom and pivotally secured to said housing and operatively connected to said cable for pivotal actuation thereof whereby when said cable is actuated by said cable actuation means said cable, in turn, pivotally actuates said lever finger to axially displace said plunger via engagement with said cap of said plunger.

6. The disc brake actuator of claim 1, wherein said mechanical actuating means further includes:
a cable;
manual cable actuation means;
spherical element means secured to said cap of said plunger; and
said lever means including a cam means pivotally secured to said housing and operatively connected to said cable, said cam means cammingly engaged with said spherical element whereby when said cam means is pivotally actuated by manual actuation of said cable in response to said cable actuation means, said spherical element is moved thereby causing said plunger to be axially displaced.

7. The disc brake actuator of claim 6, wherein said spherical element means is a ball bearing rotatably mounted in a socket secured to said cap of said plunger.

8. The disc brake actuator of claim 1, further comprising:
a hydraulic pressure chamber formed within said housing and wherein said piston is operatively disposed; and
hydraulic pressure actuating means for reciprocating said piston therein to apply said disc brake.

9. The disc brake actuator of claim 1, wherein said constraining means comprises means for positioning said expander means in an initial position prior to axial displacement thereof and for returning said plunger to said initial position following removal of the axially displacing force by said mechanical actuating means.

* * * * *